United States Patent
Ryan

(10) Patent No.: US 7,800,879 B2
(45) Date of Patent: Sep. 21, 2010

(54) ON-CHIP SENSOR ARRAY FOR TEMPERATURE MANAGEMENT IN INTEGRATED CIRCUITS

(75) Inventor: Vivian Ryan, Hampton, NJ (US)

(73) Assignee: Agere Systems Inc., Allentown, PA (US)

( * ) Notice: Subject to any disclaimer, the term of this patent is extended or adjusted under 35 U.S.C. 154(b) by 915 days.

(21) Appl. No.: 11/460,459

(22) Filed: Jul. 27, 2006

(65) Prior Publication Data

US 2008/0026503 A1 Jan. 31, 2008

(51) Int. Cl.
*H01L 21/00* (2006.01)
(52) U.S. Cl. .......................... 361/103; 438/54
(58) Field of Classification Search ................. 257/930, 257/467–470, 414, 108, 252; 261/103; 219/494; 324/760; 438/48, 49, 54, 55
See application file for complete search history.

(56) References Cited

U.S. PATENT DOCUMENTS

| | | | | |
|---|---|---|---|---|
| 4,779,161 A | * | 10/1988 | DeShazo, Jr. ............... 257/500 |
| 5,502,838 A | | 3/1996 | Kikinis | |
| 5,539,186 A | * | 7/1996 | Abrami et al. ......... 257/E23.08 |
| 5,619,430 A | * | 4/1997 | Nolan et al. ................ 320/150 |
| 5,962,854 A | * | 10/1999 | Endo .......................... 250/349 |
| 6,531,911 B1 | * | 3/2003 | Hsu et al. ................... 327/512 |
| 6,717,225 B2 | * | 4/2004 | Male .......................... 257/401 |
| 6,825,681 B2 | * | 11/2004 | Feder et al. ................ 324/760 |
| 7,549,795 B2 | * | 6/2009 | Kosta et al. ................ 374/170 |
| 2004/0264093 A1 | * | 12/2004 | Boerstler et al. ........... 361/103 |
| 2005/0166166 A1 | | 7/2005 | Chandra et al. | |
| 2006/0006166 A1 | * | 1/2006 | Chen et al. ................. 219/494 |

\* cited by examiner

*Primary Examiner*—Steven Loke
*Assistant Examiner*—Jonathan Han
(74) *Attorney, Agent, or Firm*—Ryan, Mason & Lewis, LLP

(57) ABSTRACT

Embodiments of the invention provide methods and apparatus for managing temperature in integrated circuits. In accordance with an aspect of the invention, an integrated circuit comprises a monitored region defined by three or more edges. What is more, the integrated circuit comprises at least two temperature sensors for each of the three or more edges. The temperature sensors are arranged along the three or more edges such that each edge has substantially the same arrangement of temperature sensors. Thermal management of the integrated circuit may be accomplished by modifying functional aspects of the integrated circuit in response to measurements provided by the temperature sensors.

20 Claims, 5 Drawing Sheets dant disadvantages found in the prior art.

ON-CHIP SENSOR ARRAY FOR TEMPERATURE MANAGEMENT IN INTEGRATED CIRCUITS

FIELD OF THE INVENTION

The present invention relates generally to integrated circuits, and, more particularly, to temperature sensors in integrated circuits.

BACKGROUND OF THE INVENTION

Integrated circuits typically comprise large numbers of transistors, resistors, capacitors, diodes, interconnects and other such devices formed within a small area on a semiconductor substrate. Each of these circuit devices may generate heat while the integrated circuit is operating. If this heat generation is not counterbalanced by heat dissipation, the temperature may rise in the integrated circuit to the point where performance is degraded, and even to a point where physical damage to the integrated circuit may occur. As a result, the ability to accurately track the thermal conditions of an integrated circuit is paramount with respect to reliability, functionality and design optimization.

Making things more difficult is the fact that heat is not uniformly generated across a typical integrated circuit. Instead, a modem integrated circuit will usually be divided into a number of functional units that occupy different regions. These functional units are frequently not used equally. For example, a certain application may utilize logic circuitry more than memory circuitry. As a result, some regions of an integrated circuit will tend to generate heat faster than others. What is more, variations in production processes, feedback between circuit devices and other unintended phenomena may also cause regions of an integrated circuit to have higher operating temperatures. The relatively hotter regions are conventionally called "hot spots."

It is known that one or more temperature sensors may be added to an integrated circuit in order to monitor temperature and mitigate the detrimental effects of hot spots. See, for example, U.S. Patent Application No. 2005/0166166, entitled "Method and Apparatus for Thermal Testing of Semiconductor Chip Designs," U.S. Pat. No. 5,502,828, entitled "Temperature Management for Integrated Circuits," and U.S. Patent Application No. 2006/0006166, entitled "On-Chip Power Supply Regulator and Temperature Control System."

Conventional arrangements such as those described in the above-cited references have a number of disadvantages. For example, they typically require that temperature sensors be positioned in a central region of the integrated circuit, often close to predicted hot spots. Critical space must therefore be sacrificed for the temperature sensors, and the temperature sensors cannot be easily retrofitted onto previously designed integrated circuits. In addition, the temperature sensors in the above-cited references typically only yield data about those regions of the integrated circuit in the immediate vicinity of a temperature sensor. These methods, therefore, fail to provide broad coverage of the integrated circuit, and, as a result, unpredicted critical temperature events may go entirely undetected.

For the foregoing reasons, there is a need for methods and apparatus allowing the thermal conditions of an integrated circuit to be accurately tracked in real time without the attendant disadvantages found in the prior art.

SUMMARY OF THE INVENTION

Embodiments of the present invention address the above-identified need by providing methods and apparatus for managing temperature in integrated circuits.

In accordance with an aspect of the invention, an integrated circuit comprises a monitored region that is defined by three or more edges. What is more, the integrated circuit comprises at least two temperature sensors for each of the three or more edges. The temperature sensors are arranged along the three or more edges such that each edge has substantially the same arrangement of temperature sensors.

In accordance with an illustrative embodiment of the invention, an integrated circuit contains control circuitry and a square-shaped monitored region. Twelve temperature sensors are arranged along the four edges of the monitored region, each edge having substantially the same arrangement of temperature sensors. The temperature sensors allow the control circuitry to monitor the total power dissipation and the center of power dissipation for the monitored region in real time. Moreover, the control circuitry is operative to modify functional aspects of the integrated circuit in response to these power measurements.

Advantageously, the arrangement of temperature sensors in the illustrative embodiment allows broad coverage of the integrated circuit while, at the same time, providing a high degree of sensitivity to changes in the thermal conditions within the monitored region. In addition, the arrangement does not encroach on valuable circuit areas within the integrated circuit and may not require additional processing steps to manufacture.

These and other features and advantages of the present invention will become apparent from the following detailed description which is to be read in conjunction with the accompanying figures.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

It should also be understood that the various features shown in the accompanying figures may not be drawn to scale. Moreover, for economy of description, the figures are simplified to show aspects of the invention. In actual application, an integrated circuit in accordance with aspects of the invention will likely contain more elements than those illustrated herein. These more extensive integrated circuits will still come within the scope of the invention.

Figure 1:
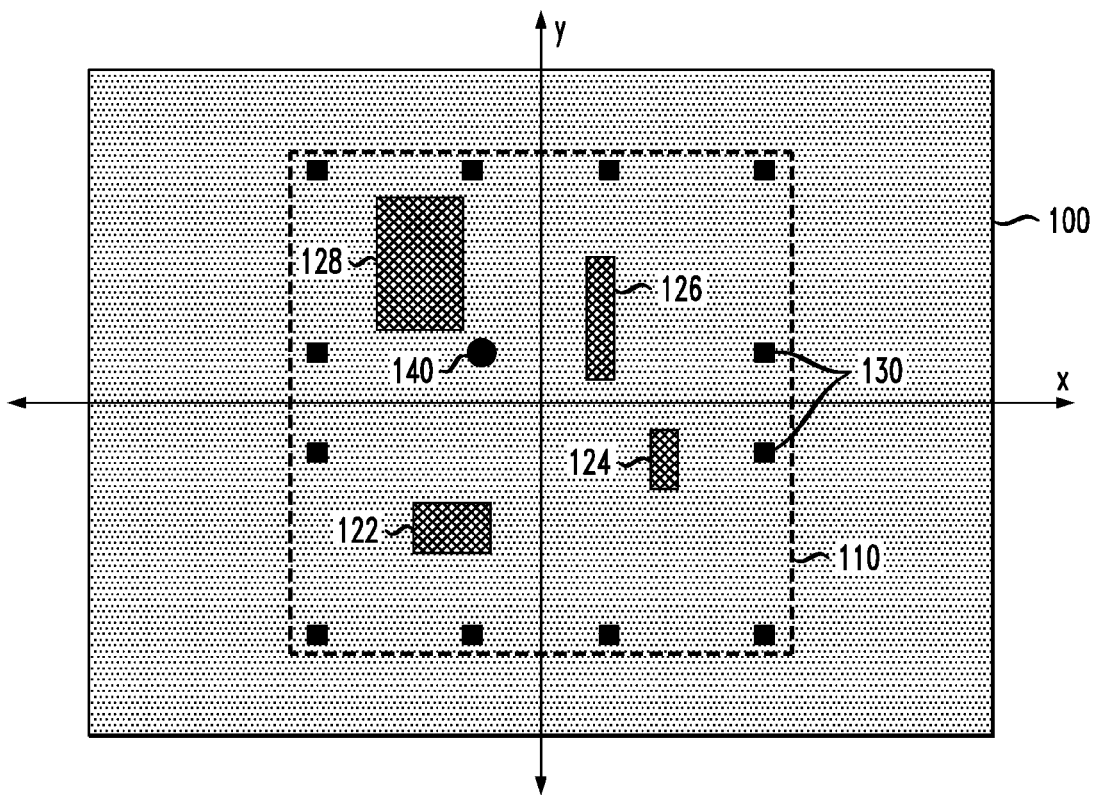
FIG. 1 shows a plan view of an integrated circuit in accordance with a first embodiment of the invention.

FIG. 1 shows an integrated circuit 100 in accordance with an illustrative embodiment of the invention. Within the integrated circuit is defined a monitored region 110 for which power dissipation information is desired. In this embodiment, the monitored region is substantially square in shape. Nevertheless, the monitored region could have a different shape and the result would still come within the scope of this invention. The monitored region could, for example, be a triangle, hexagon or octagon.

The monitored region 110 comprises four illustrative heat producing regions of various sizes and shapes, labeled 122, 124, 126 and 128, respectively. Twelve thermal sensors 130 are arranged along the four edges of the monitored region. In accordance with an aspect of the invention, each of the four edges has substantially the same arrangement of temperature sensors. FIG. 1 also shows a center of power dissipation 140 for the monitored region (described in greater detail below).

Figure 2:
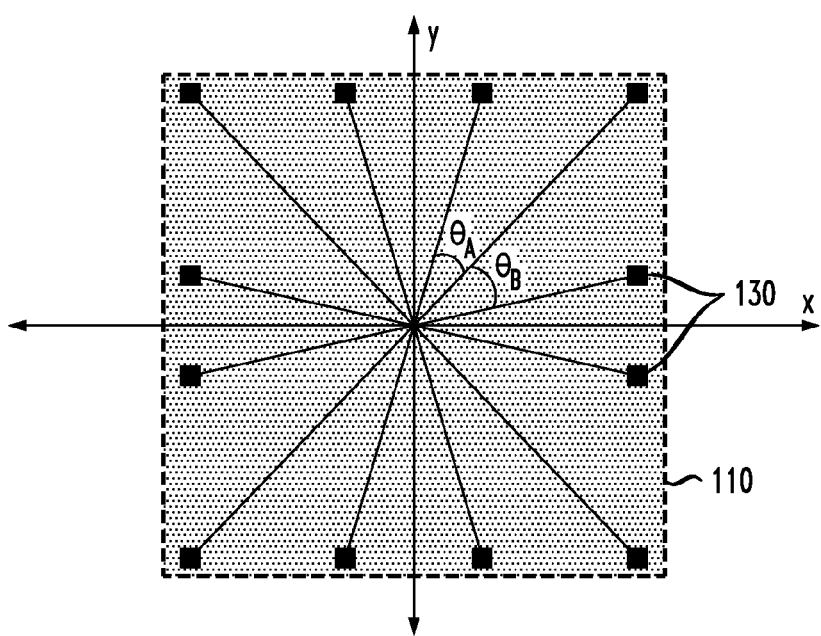
FIG. 2 illustrates aspects of the positioning of the temperature sensors in the FIG. 1 integrated circuit.

FIG. 2 further illustrates the arrangement of temperature sensors 130 in the monitored region 110. FIG. 2 shows lines radiating from the center of the monitored region to each of the temperature sensors. In accordance with another aspect of the invention, the temperature sensors are distributed along the four edges of the monitored region such that the angle formed by any two lines radiating from the center of the monitored region to any respective two adjacent temperature sensors is substantially a constant. In FIG. 2, for example, angle $\theta_A$ is substantially equal to angle $\theta_B$. While not necessary to the functioning of the invention, this arrangement of temperature sensors is preferred because it allows the thermal conditions of the monitored region to be determined with greater precision.

The thermal sensors 130 allow several thermal parameters to be determined for the monitored region 110. These thermal parameters include the total power dissipation for the monitored region, as well as the center of power dissipation 140. The center of power dissipation is analogous to the center of mass when considering a distribution of masses. It is a geometric representation of how the heat generating circuit devices are distributed in the monitored region. If, for example, the monitored region were divided into a system of power dissipating points, the location of the center of power dissipation, R, would be equal to the average of the points' respective positions, $r_i$, weighted by their respective power dissipations, $p_i$:

$$R = \frac{1}{P} \sum_i p_i r_i,$$

where P is the total power dissipation from the monitored region (equal to the sum of power dissipations from the individual points).

Determination of total power dissipation and the center of power dissipation 140 may be accomplished by using the temperatures measured at the temperature sensors 130 to form a series of simultaneous heat conduction equations yielding a unique solution. The temperature measured at each of the temperature sensors can be simplified by applying a conventional multipole expansion to the heat conduction equation:

$$\begin{aligned} T(\bar{r}) &= \int\int_S \frac{p(\bar{r}')}{2\pi k \cdot |\bar{r} - \bar{r}'|} dS' \\ &= \frac{1}{r} P \frac{1}{2\pi k} + \frac{\bar{r}}{2\pi k r^3} \int\int_S \bar{r}' p \, dS' + \text{quadrupole} \\ &\approx \frac{P}{2\pi k r} + \frac{\bar{r} \cdot \bar{p}}{2\pi k r^3} \\ &= \frac{1}{2\pi k}\left(\frac{P}{r} + \frac{x \cdot p_x}{r^3} + \frac{y \cdot p_y}{r^3}\right), \end{aligned}$$

where $T(\bar{r})$ is the temperature measured at a temperature sensor 130 with vector position $\bar{r}$, S is the area of the monitored region 110, $p(\bar{r}')$ is the power dissipation at the vector position $\bar{r}'$, r is the amplitude of the vector $\bar{r}$, k is the thermal conduction constant for the semiconductor substrate material (e.g., silicon), and $p_x$ and $p_y$ are the dipole components, respectively, of the center of power dissipation 140 (having units of power-length). One skilled in the art will recognize that, once heat conduction equations are set up for the temperature sensors in terms of the thermal parameters P, $p_x$ and $p_y$, unique solutions for these parameters can be determined for the monitored region by using various conventional methods for solving linear simultaneous equations.

Once $p_x$ and $p_y$ are determined, the Euclidean coordinates of the center of power dissipation 140 can be determined simply by dividing $p_x$ and $p_y$ by P:

$$x = p_x/P, \, y = p_y/P.$$

In this way, the center of power dissipation can be ascribed a geometric location within the monitored region 110.

Figure 3:
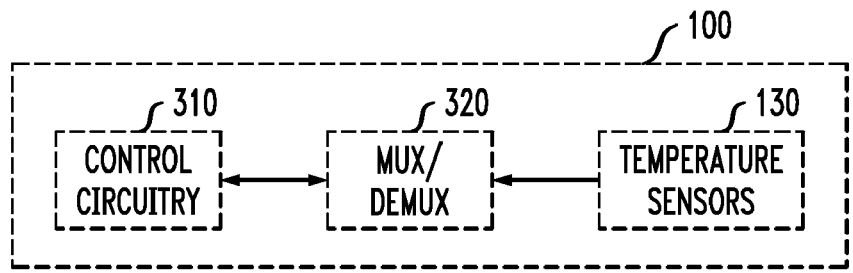
FIG. 3 shows a block diagram of the FIG. 1 integrated circuit.
Figure 4:
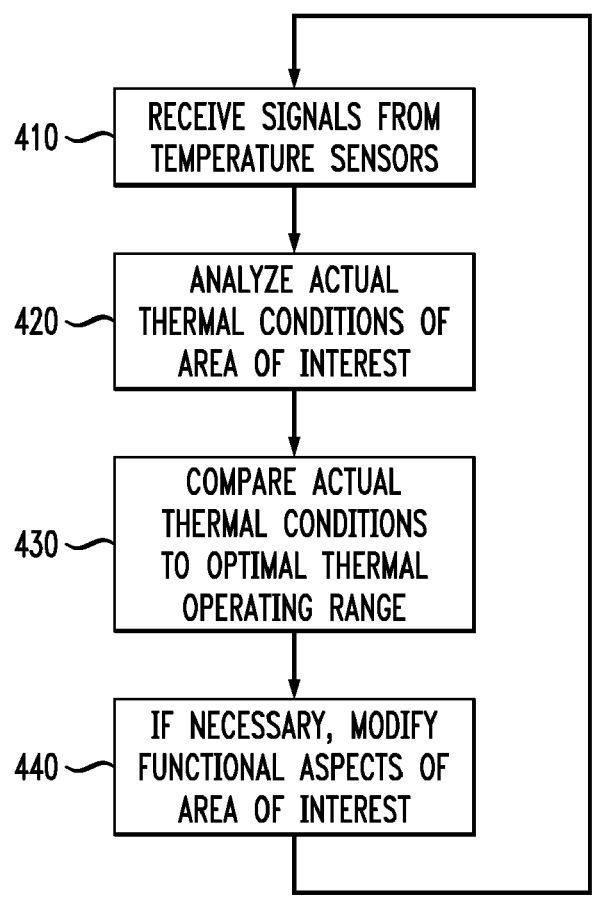
FIG. 4 shows a flow diagram of illustrative thermal management operations in the FIG. 1 integrated circuit.

Advantageously, the temperature sensors 130 not only allow the thermal conditions of the monitored region 110 to be measured in real time with high accuracy and sensitivity, but also provide a means of managing these thermal conditions. FIGS. 3 and 4, for example, show how this kind of thermal management can be implemented in the illustrative integrated circuit 100 shown in FIG. 1. FIG. 3 shows a block diagram of the integrated circuit 100. In addition to comprising the temperature sensors, the integrated circuit further comprises control circuitry 310 and multiplexer/demultiplexer ("mux/demux") 320. FIG. 4 shows a flow diagram of illustrative operations that allow the control circuitry to manage the thermal conditions in the integrated circuit.

Multiplexers generally allow multiple signals to be combined into a single combined signal. A demultiplexer, in turn, breaks the combined signal back into its separate signal constituents. The mux/demux 320 allows the signals from the temperature sensors 130 to be routed to the control circuitry 310 through a single, or just a few, signal pathways as opposed to through separate signal pathways for each temperature sensor. In this way, valuable space is conserved in the integrated circuit 100 and the complexity of the design and manufacture is reduced. Multiplexers and demultiplexers are conventionally used in integrated circuits and, therefore, their design and operation will be familiar to one skilled in the art. The mux/demux can be partially or wholly built into the control circuitry or, instead, can be a discrete device on the integrated circuit.

When routing the signals from the temperature sensors 130 to the control circuitry 310, precautions should be taken to transmit the temperature signals across as few vertical vias (i.e., contacts) as possible. Vertical vias in integrated circuits typically comprise abutted metal features that may produce their own temperature dependent signals as a result of, for example, the thermocouple effect. In addition, the temperature sensors should not be located near high frequency sources that may impart electrical noise to the temperature sensors' temperature signals. Electrical noise may cause the temperature measurements from the temperature sensors to be higher than the actual temperature by, for example, one to five degrees Celsius, depending on the frequency and amplitude of the noise. Despite precautions, if electrical noise is encountered, several signals from each of the temperature sensors can be averaged to lessen the effect of noise on the temperature measurements.

Referring now to FIG. 4, the control circuitry 310 receives the signals from the temperature sensors 130 in step 410. In step 420, the control circuitry analyzes the thermal conditions of the monitored region 110. This step may comprise, for example, calculating the total power dissipation and center of power dissipation for the monitored region in the manner described above. Subsequently, in step 430, the actual thermal conditions of the monitored region are compared to the optimal thermal range in which the monitored region is designed to operate. If the actual thermal conditions are outside of those desired, the control circuitry modifies functional aspects of the integrated circuit in step 440 to attempt to bring the actual thermal conditions within the optimal thermal operating range. This sequence of steps is preferably performed continuously while the integrated circuit 100 is operating, thereby providing for real-time thermal management of the integrated circuit. In other embodiments, periodic performance of these steps, or alternative steps, may be used.

The functional aspects that the control circuitry 310 may modify in step 440 may include, for example, clock speed and supply voltage. Both of these functional aspects of an integrated circuit tend to directly affect temperature. Depending on the configuration of the control circuitry, the clock speed and/or supply voltage may be modified globally across the entire integrated circuit 100, or, alternatively, may be modified on a localized basis in only those circuit devices that are creating excessive heat.

For example, FIG. 1 shows the position of the center of power dissipation 140 in the monitored region 110 during normal operation (i.e., operation within the optimal thermal operating range). If however, the heat producing region 122 were to start producing abnormally large amounts of heat, this new thermal condition would be detected by the control circuitry 310 in steps 410, 420 and 430 of FIG. 4. More precisely, the control circuitry would determine that the total power dissipation for the monitored region 110 had increased and that the center of the power dissipation had shifted in geometric location toward the heat producing region 122. The control circuitry could then, in step 440, reduce the clock speed and/or supply voltage in the entire integrated circuit 100, just in the monitored region 110, or even in just the heat producing region 122 in an effort to bring the thermal conditions of the monitored region back within the optimal thermal operating range.

It should be noted, however, that the control circuitry 310 could modify other functional aspects of the integrated circuit 100 and still come within the scope of the invention. Beyond clock speed and supply voltage, the control circuitry could also modify, for example, the amount of cooling provided to the integrated circuit (e.g., through a forced air system or through a thermoelectric cooler), or even the operation of another heat generating device located near the integrated circuit (e.g., another integrated circuit). What is more, the control circuitry may be operative to reroute one or more processing tasks from the functional unit that is excessively hot.

Temperature sensors are conventionally utilized in integrated circuits and, as a result, their many forms will be familiar to one skilled in the art. Incorporation of temperature sensors in integrated circuits is described in, for example, J. Altet et al., *Thermal Testing of Integrated Circuits*, Springer, 2002, which is incorporated herein by reference. The temperature sensors 130 may include, as an example, semiconductor diodes comprising forward-biased p-n junctions that change current flow in response to temperature. Additionally or alternatively, the temperature sensors may comprise resistor elements that change electrical resistance in response to temperature. Moreover, the temperature sensors may comprise circuits with rates of signal propagation that are a function of temperature. The temperature sensors may also comprise oscillator circuits whose frequencies are a function of temperature.

Figure 5:
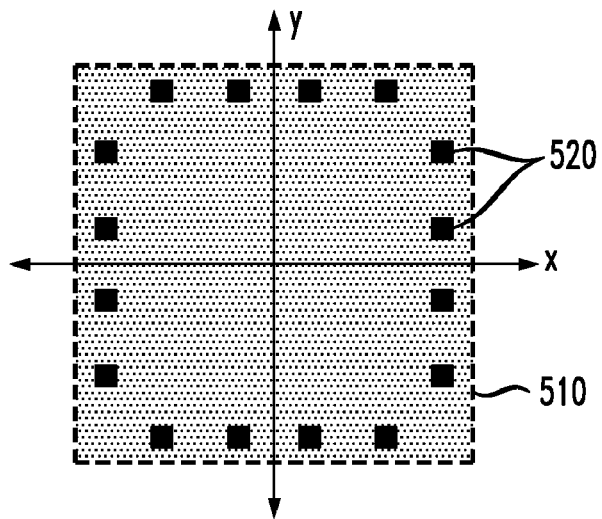
FIG. 5 shows a plan view of a monitored region within an integrated circuit in accordance with a second embodiment of the invention.
Figure 6:
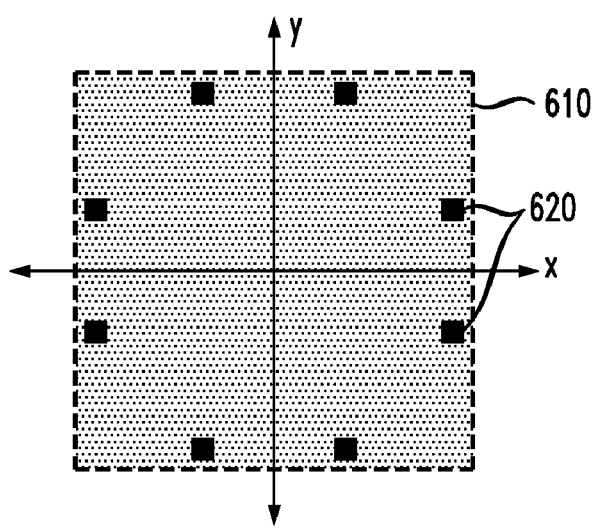
FIG. 6 shows a plan view of a monitored region within an integrated circuit in accordance with a third embodiment of the invention.

While FIG. 1 shows a particular configuration of the temperature sensors 130, alternative arrangements are also contemplated and would still come within the scope of the invention. FIGS. 5 and 6 show two alternate configurations for a square monitored region. FIG. 5 shows a monitored region 510 with sixteen temperature sensors 520 arranged in accordance with a second illustrative embodiment of the invention. FIG. 6 shows a monitored region 610 comprising eight temperature sensors 620.

Generally, an array of 8 to 16 temperature sensors for a given monitored region may be preferred in typical applications. In such applications, this number of temperature sensors overcomes thermal gradient issues and provides good stereoscopic imaging of the temperature distribution within the monitored region. Less than this number tends to generate a substantial amount of uncertainty when calculating the thermal parameters. Use of greater than 16 temperature sensors, on the other hand, tends to provide little additional benefit in sensitivity and accuracy. Of course, alternative embodiments could use a number of temperature sensors outside of the exemplary range.

Figure 7:
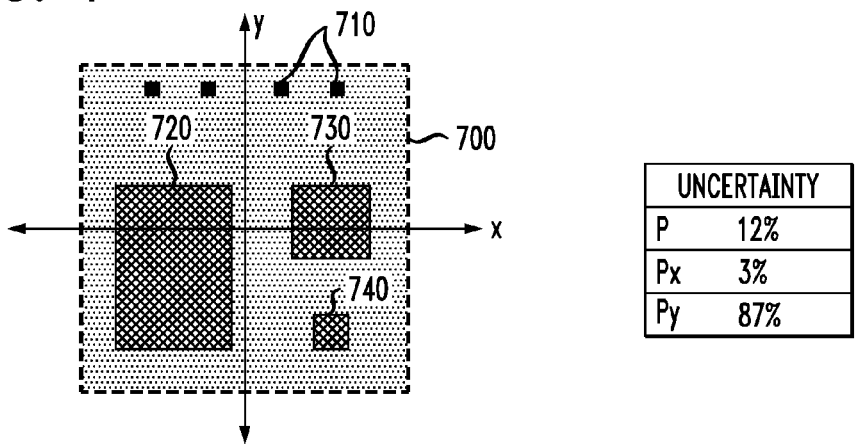
FIGS. 7-9 show uncertainty as a function of temperature sensor quantity and placement for an illustrative monitored region.
Figure 8:
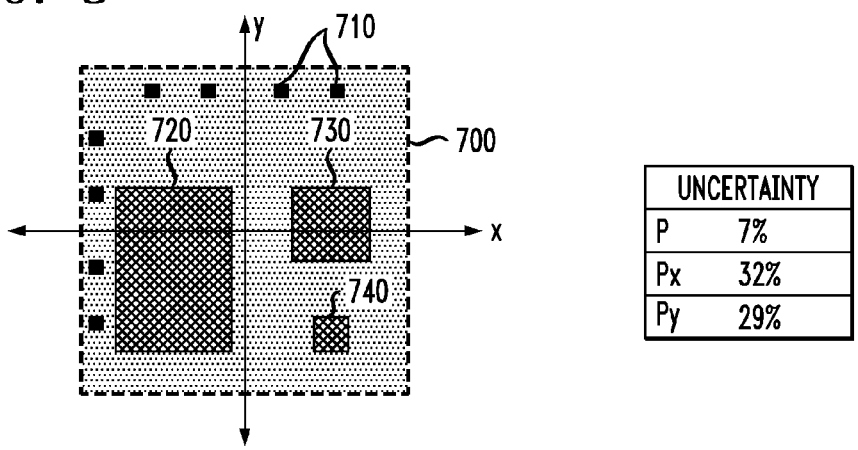
Figure 9:
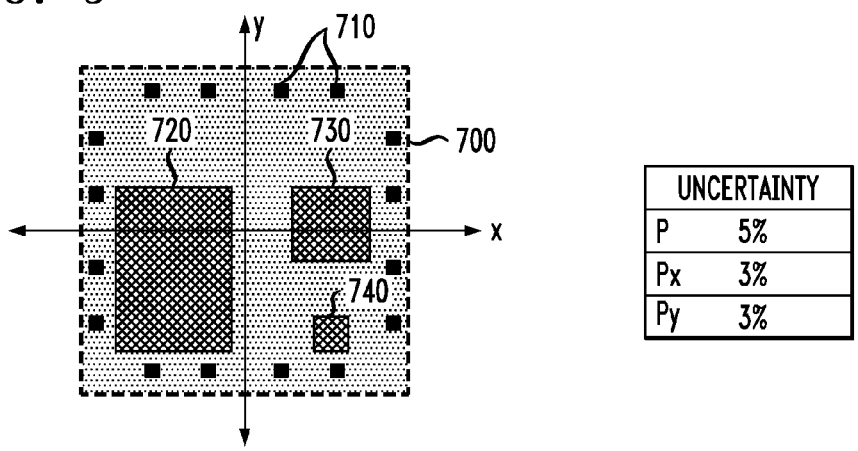

FIGS. 7-9 show the uncertainty in the measurements of P, $p_x$ and $p_y$ for a particular illustrative monitored region 700 with differing arrangements of temperature sensors 710. The temperature sensors in these examples are assumed to each have an accuracy of 2% per degree Celsius. The monitored region in these figures comprises three heat producing regions 720, 730 and 740. Heat producing region 720 dissipates power at a rate of about 300 milliwatts per square millimeter ($mW/mm^2$). Heat producing regions 730 and 740 dissipate power at about 337 and 744 $mW/mm^2$, respectively.

The temperature sensors 710 in FIG. 7 are arranged along only one side of the monitored region 700. The temperature sensors in FIG. 8 are arranged along two edges of the monitored region. Finally, in FIG. 9, the temperature sensors are arranged along all four edges of the monitored region in accordance with aspects of the invention.

One can clearly see that the uncertainty in the measured thermal parameters is very dependent on the arrangement of the temperature sensors 710. FIG. 7 (temperature sensors along one edge), for example, displays an uncertainty of 87% for $p_y$, while FIG. 8 (temperature sensors along two edges) displays an uncertainty of 32% for $p_x$ and 29% for $p_y$. FIG. 9 (temperature sensors along four edges), in contrast, displays an uncertainty of 5% or less for all three thermal parameters:

P, $p_x$ and $p_y$. Such a trend plainly demonstrates the advantages of arranging the temperature sensors in accordance with the invention. An arrangement in accordance with the present invention provides broad coverage and high sensitivity for changes in temperature conditions within the monitored region 700.

The formation of integrated circuits is well known in the art. Complementary metal-oxide-semiconductor (CMOS) technology is a common technology for forming circuit devices in integrated circuits. This technology will be familiar to one skilled in the art and, moreover, is described in a number of readily available references including, for example, S. Wolf et al., *Silicon Processing for the VLSI Era, Volumes* 1-3, Lattice Press, 1986, 1990 and 1995, which are incorporated herein by reference.

In the integrated circuit 100, the temperature sensors 130 are also preferably formed using CMOS technology. Moreover, in order to reduce the complexity and cost of manufacturing the integrated circuit, the temperature sensors are formed at the same time other circuit devices are formed in the integrated circuit. If the temperature sensors comprise semiconductor diodes (i.e., p-n junctions), for example, they may be formed at the same time other semiconductor junctions are formed in the integrated circuit. CMOS transistors contain semiconductor junctions that are very similar to the junctions needed for temperature sensors.

Figure 10:
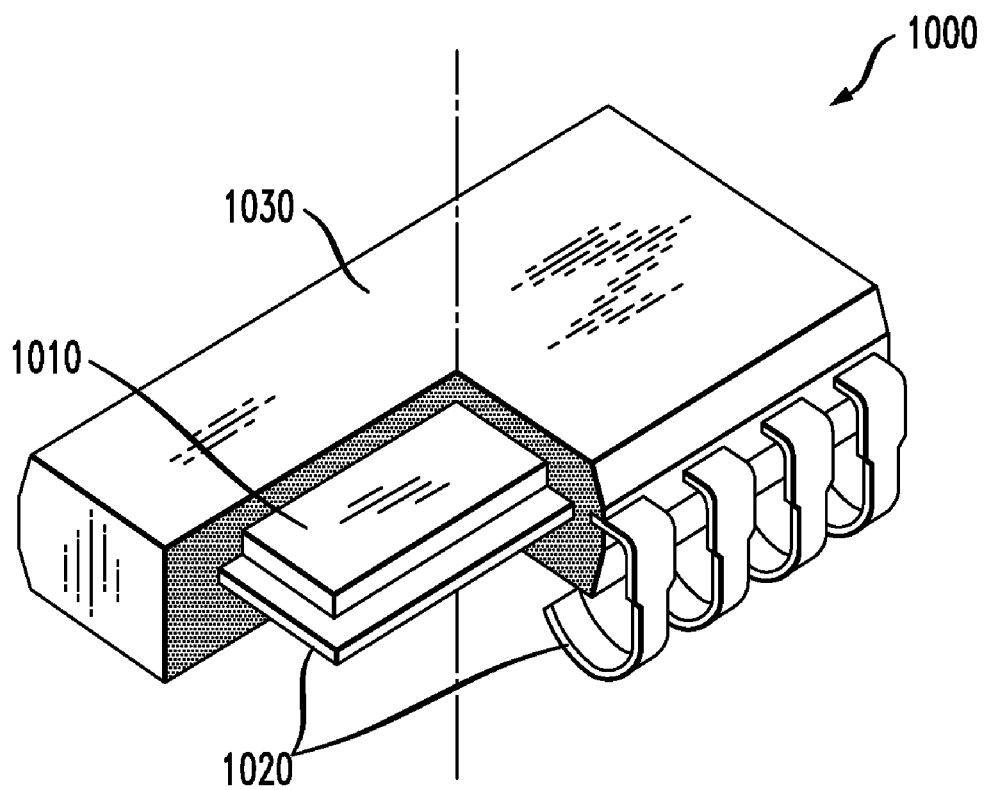
FIG. 10 shows a perspective view of a packaged integrated circuit embodying features of the invention with the package partially cut away.

Integrated circuits comprising aspects of the invention come within the invention. These integrated circuits may be packaged or unpackaged. FIG. 10, for example, shows a integrated circuit 1000 consistent with this invention packaged in a typical plastic leadframe package. The packaged integrated circuit comprises a die 1010 attached to a leadframe 1020. A plastic mold 1030 encapsulates the die and a portion of the leadframe.

It should also again be emphasized that the above-described embodiments of the invention are intended to be illustrative only. Other embodiments can use different types and arrangements of elements for implementing the described functionality. These numerous alternative embodiments within the scope of the following claims will be apparent to one skilled in the art.

What is claimed is:

1. An integrated circuit comprising:
    a monitored region, the monitored region defined by three or more edges; and
    at least two temperature sensors for each of the three or more edges, the temperature sensors being arranged along the three or more edges such that each edge has substantially the same arrangement of temperature sensors;
    wherein positional information of a thermal characteristic of the monitored region is deter mined by combining an output of at least a first one of the temperature sensors at a first position along a first one of the edges with an output of at least a second one of the temperature sensors at a second position along a second one of the edges, said positional information denoting a position other than the first and second positions; and
    wherein the position denoted by the positional information is not a position of any of the temperature sensors and is spaced a distance from each of the first and second positions which is greater than a distance between two adjacent ones of the temperature sensors arranged along a given one of the edges.

2. The integrated circuit of claim 1, wherein the monitored region is substantially the entire integrated circuit.

3. The integrated circuit of claim 1, wherein the plurality of temperature sensors allows the determination of power dissipation in the monitored region.

4. The integrated circuit of claim 3, wherein the power dissipation can be determined with an uncertainty less than about ten percent.

5. The integrated circuit of claim 1, wherein the plurality of temperature sensors allows the determination of a center of power dissipation for the monitored region.

6. The integrated circuit of claim 1, wherein the monitored region is substantially a square defined by four edges.

7. The integrated circuit of claim 6, wherein eight temperature sensors are arranged along the four edges of the monitored region with two of the eight temperature sensors arranged along each of the four edges.

8. The integrated circuit of claim 6, wherein twelve temperature sensors are arranged along the four edges of the monitored region with three of the twelve temperature sensors arranged along each of the four edges.

9. The integrated circuit of claim 6, wherein sixteen temperature sensors are arranged along the four edges of the monitored region with four of the sixteen temperature sensors arranged along each of the four edges.

10. An integrated circuit comprising:
    a monitored region, the monitored region defined by three or more edges; and
    at least two temperature sensors for each of the three or more edges, the temperature sensors being arranged along the three or more edges such that each edge has substantially the same arrangement of temperature sensors;
    wherein the plurality of temperature sensors are arranged such that a first interior angle formed by a first set of two lines radiating from a center of the monitored region to respective ones of a first set of two adjacent temperature sensors is substantially equal to a second interior angle formed by a second set of two lines radiating from the center of the monitored region to respective ones of a second set of two adjacent temperature sensors.

11. The integrated circuit of claim 1, wherein at least one of the plurality of temperature sensors comprises a semiconductor diode, a resistor element or an oscillator circuit.

12. The integrated circuit of claim 1, wherein at least some signals produced by the temperature sensors are multiplexed.

13. A method of forming an integrated circuit, the method comprising the steps of:
    forming a monitored region, the monitored region defined by three or more edges; and
    forming at least two temperature sensors for each of the three or more edges, the temperature sensors being arranged along the three or more edges such that each edge has substantially the same arrangement of temperature sensors;
    wherein positional information of a thermal characteristic of the monitored region is determined by combining an output of at least a first one of the temperature sensors at a first position along a first one of the edges with an output of at least a second one of the temperature sensors at a second position along a second one of the edges, said positional information denoting a position other than the first and second positions; and
    wherein the position denoted by the positional information is not a position of any of the temperature sensors and is spaced a distance from each of the first and second positions which is greater than a distance between two adjacent ones of the temperature sensors arranged along a given one of the edges.

14. The method of claim 13, wherein the temperature sensors are formed using complementary metal-oxide-semiconductor technology.

15. The method of claim 13, wherein forming the plurality of temperature sensors does not require more processing steps than are required to form the remainder of the integrated circuit.

16. An integrated circuit comprising:
- a monitored region, the monitored region defined by three or more edges;
- at least two temperature sensors for each of the three or more edges, the temperature sensors being arranged along the three or more edges such that each edge has substantially the same arrangement of temperature sensors; and
- control circuitry, the control circuitry at least operative to receive one or more signals from the plurality of temperature sensors, analyze the received signals to determine one or more thermal properties of the monitored region, and modify one or more functional aspects of the integrated circuit if the determined thermal properties fall outside a predetermined range;
- wherein positional information of a thermal characteristic of the monitored region is determined by combining an output of at least a first one of the temperature sensors at a first position along a first one of the edges with an output of at least a second one of the temperature sensors at a second position along a second one of the edges, said positional information denoting a position other than the first and second positions; and
- wherein the position denoted by the positional information is not a position of any of the temperature sensors and is spaced a distance from each of the first and second positions which is greater than a distance between two adjacent ones of the temperature sensors arranged along a given one of the edges.

17. The integrated circuit of claim 16, wherein the control circuitry is operative to change one or more clock speeds in the integrated circuit.

18. The integrated circuit of claim 16, wherein the control circuitry is operative to change one or more supply voltages in the integrated circuit.

19. The integrated circuit of claim 16, wherein the control circuitry is operative to change one or more cooling mechanisms for the integrated circuit.

20. The integrated circuit of claim 16, wherein the control circuitry is operative to reroute one or more processing tasks in the integrated circuit.

* * * * *

UNITED STATES PATENT AND TRADEMARK OFFICE
CERTIFICATE OF CORRECTION

| | | |
|---|---|---|
| PATENT NO. | : 7,800,879 B2 | Page 1 of 1 |
| APPLICATION NO. | : 11/460459 | |
| DATED | : September 21, 2010 | |
| INVENTOR(S) | : Vivian Ryan | |

It is certified that error appears in the above-identified patent and that said Letters Patent is hereby corrected as shown below:

In the claims:

Claim 1, col. 7, line 53, please delete "deter ruined" and insert --determined--.

Signed and Sealed this

Thirtieth Day of November, 2010

David J. Kappos
*Director of the United States Patent and Trademark Office*